Jan. 31, 1961 K. J. LEACH 2,970,008
SAFETY WHEEL ATTACHMENT FOR MOTOR VEHICLES
Filed Oct. 6, 1959 2 Sheets-Sheet 1
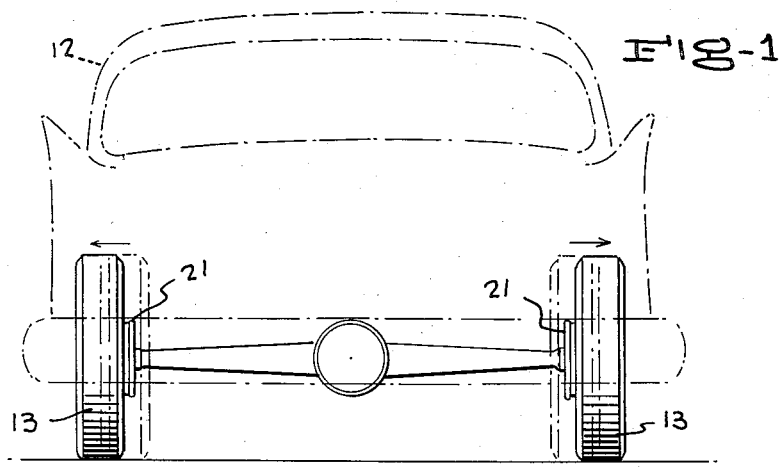
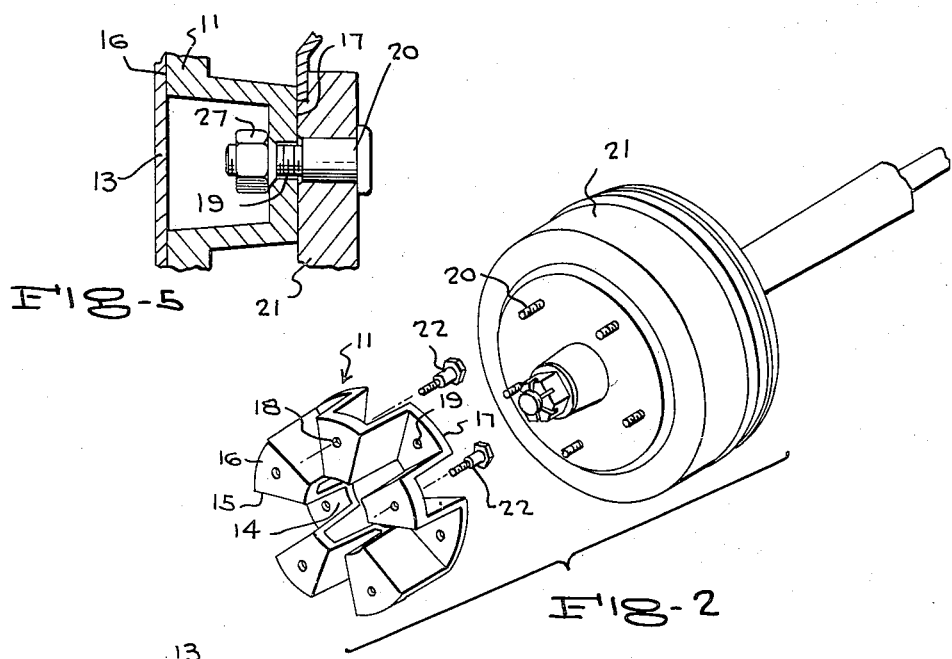
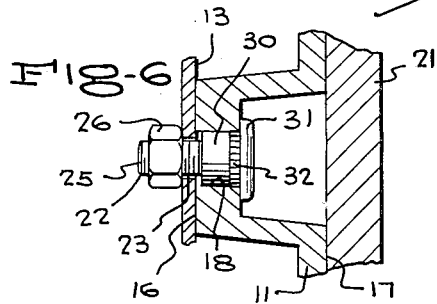
INVENTOR.
KENNETH J. LEACH
BY
McMorrow, Berman & Davidson
ATTORNEYS Jan. 31, 1961 K. J. LEACH 2,970,008
SAFETY WHEEL ATTACHMENT FOR MOTOR VEHICLES
Filed Oct. 6, 1959 2 Sheets-Sheet 2

INVENTOR.
KENNETH J. LEACH
BY
McMorrow, Berman & Davidson
ATTORNEYS

United States Patent Office 2,970,008
Patented Jan. 31, 1961

2,970,008

SAFETY WHEEL ATTACHMENT FOR MOTOR VEHICLES

Kenneth J. Leach, South Gate, Calif.
(3213D Hill St., Huntington Park, Calif.)

Filed Oct. 6, 1959, Ser. No. 844,779

3 Claims. (Cl. 301—1)

This invention relates to safety devices for motor vehicles, and more particularly to an attachment for widening the wheel base of motor vehicles so as to improve the stability of the vehicles and make them easier to control, particularly on curves.

The main object of the invention is to provide an improved safety wheel attachment for a motor vehicle, the attachment being easy to install, involving no special tools for the installation thereof, and acting to widen the wheel base of a motor vehicle on which the attachments are installed so as to improve the stability of the vehicle, as well as to provide improved ventilation of the brake drums thereof.

A further object of the invention is to provide a wheel base-widening attachment for motor vehicles, said attachment being inexpensive to manufacture, being durable in construction, and being designed so that it may be readily fastened between the brake drums and wheels of a motor vehicle without requiring any modification of the vehicle itself.

Further objects and advantages of the invention will become apparent from the following description and claims, and from the accompanying drawings, wherein:

Figure 1 is an elevational view of the rear axle housing of a motor vehicle provided with wheel base-widening attachments according to the present invention and illustrating the degree of widening of the vehicle transverse wheel base provided by use of the attachments of this invention, the body of the motor vehicle itself being shown in dotted view.

Figure 2 is an enlarged perspective view showing an attachment according to the present invention arranged for securement to one of the vehicle brake drums and illustrating the manner in which fastening bolts are engaged through the attachment for securement of the associated vehicle wheel thereto.

Figure 5 is an enlarged cross sectional detail view taken on the line 5—5 of Figure 3.

Figure 6 is an enlarged cross sectional detail view taken on the line 6—6 of Figure 3.

Figure 4:
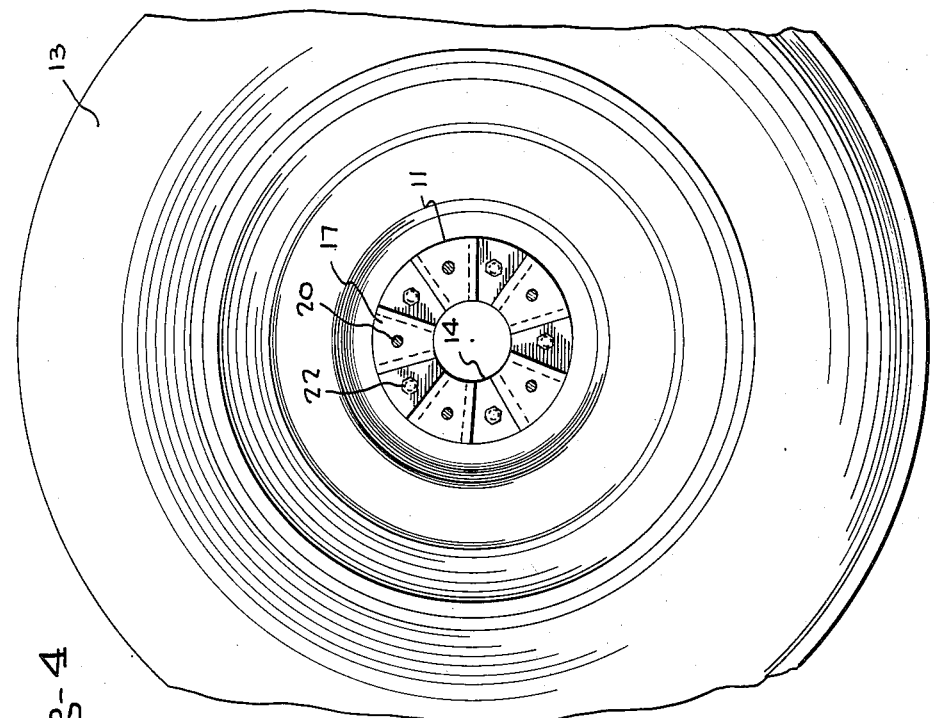
Figure 4 is a vertical cross sectional view taken substantially on the line 4—4 of Figure 3 but omitting the wheel hub structure.

Referring to the drawings, 11 designates a spacer disc member which is adapted to be interposed between a vehicle brake drum and the associated wheel, in accordance with the present invention, so as to shift the wheel outwardly with respect to the brake drum, as illustrated, for example, in Figure 1, so as to provide a widened transverse wheel base for the vehicle, and so as to more fully expose the vehicle brake drums so that they will receive improved ventilation.

In the vehicle, as shown in dotted view at 12 in Figure 1, the wheels are normally mounted in the dotted view positions thereof illustrated in Figure 1, whereas in most designs of motor vehicles, there is sufficient clearance provided for spacing the wheels further apart than originally intended. As will be readily apparent, by spreading the wheels apart, the stability of the vehicle may be substantially increased, whereby the vehicle may be made much easier to control, especially on curves and when turning sharp corners. Thus, in accordance with the present invention, the wheels, shown at 13, are spaced outwardly from their normal positions, by employing spacer discs 11 between the brake drums and the wheels in a manner presently to be described.

Each disc member 11 comprises a generally circular body formed with a central circular wheel hub aperture 14 and with a plurality of alternating, substantially radial corrugations 15, said corrugations having substantially flat outer fastening surfaces 16 and 17 located in respective planes on opposite sides of the disc member and extending perpendicularly to the axis of the disc member. As is clearly shown in Figure 5, each of the fastening surfaces 16 and 17 flares outwardly in width, and each of said surfaces is formed at its intermediate portion with openings, shown at 18 and 19, adapted to receive fastening members, namely, adapted to receive the fastening studs 20 on the brake drums 21 and fastening bolts 22 spaced to engage in the fastening openings 23 provided in the vehicle wheel 13.

The fastening bolts 22 are formed with reduced threaded shank portions 25 which are threaded to receive the normal wheel fastening nuts 26 which are originally engaged on the studs 20 of the brake drums 21 to secure the wheels to the brake drums. In installing the spacer devices 11, the wheels are first removed, and the spacer discs 11 are fastened to the brake drums by engaging the studs 20 through the apertures 19 and securing the spacer discs through the brake drums by means of nuts 27 threaded on the studs 20. The wheels 13 are then secured to the outer fastening surfaces 16 of the spacer discs by means of bolts 22, as shown in Figure 6, which are engaged through the wheel fastening apertures 23 and which are provided at their threaded outer ends with nuts 26, as above explained.

Figure 3:
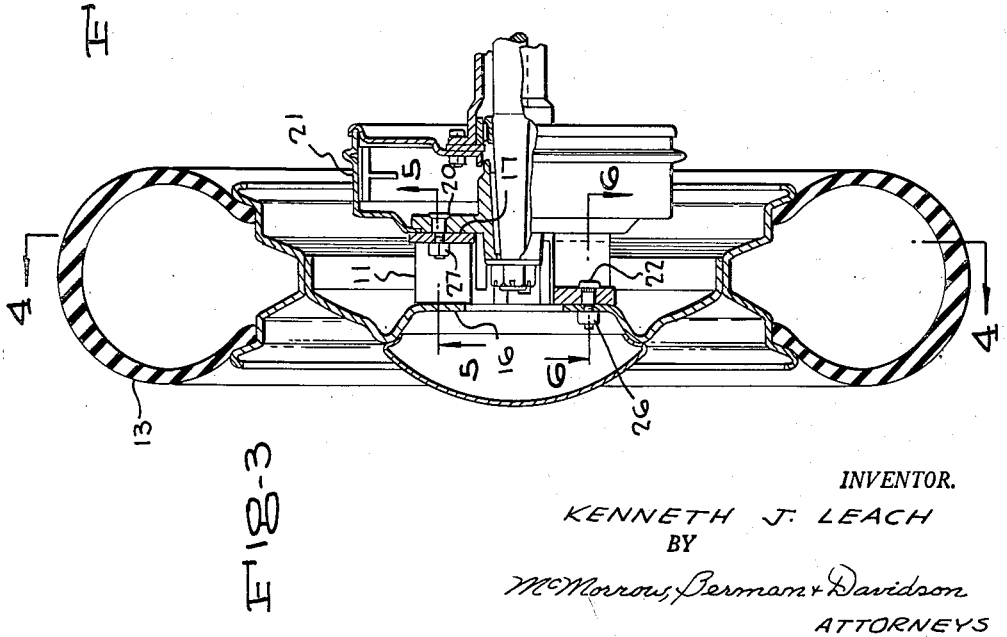
Figure 3 is an enlarged transverse vertical cross sectional view taken through a brake drum and wheel connected by a wheel base-widening attachment according to the present invention.

As is clearly shown in Figure 3, the wheels 13 are thus spaced outwardly from the brake drums by a substantial distance, whereby the drums are exposed for greatly improved ventilation, and whereby the transverse wheel base of the vehicle is substantially widened. As above explained, this greatly increases the stability of the vehicle, by greatly reducing its tendency to tip over, especially on sharp curves, or if a collision occurs wherein the vehicle is struck at one side thereof. Furthermore, as above mentioned, since the brake drums are more fully exposed to the circulation of air, the brake drums are kept cooler, providing better brake action and longer use of the brake linings.

As shown in Figure 6, the fastening bolts 22 are preferably formed with the cylindrical shank portions 30 which are snugly receivable in the openings 18, and are further formed adjacent the enlarged outer head element 31 thereof with outwardly projecting serrations 32 adapted to lockingly engage with the openings 18 to secure the bolts 30 against rotation when said bolts are tightened, whereby to form rigid connections between bolts 22 and the outer flat fastening portions 16 of the spacer discs.

While a specific embodiment of an improved safety attachment for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a plurality of transversely extending axle members, respective brake drum assemblies mounted on the outer ends of said axle members, respective spacer discs outwardly adjacent to said brake drum assemblies, said discs being of substantial axial length, respective wheels outwardly adjacent to said discs in outwardly spaced relation to said brake drum assemblies, each disc comprising a one-piece generally circular body formed with a central wheel hub opening and with equally spaced substantially radial corrugations having straight radial edges and substantially flat opposite outer surfaces defined between said edges and located in planes perpendicular to the axis of the disc, and means securing said discs to the wheels and brake drum assemblies at said flat outer surfaces.

2. A spacer disc member for spacing a vehicle wheel outwardly with respect to an associated brake drum assembly, whereby to widen the transverse wheel base of the vehicle, said disc member comprising a one-piece generally circular body formed with a central wheel hub opening and a plurality of alternating, substantially radial corrugations, said corrugations having straight radial edges and substantially flat opposite outer fastening surfaces defined between said edges and located in respective planes on opposite sides of the disc member and perpendicular to the axis of the disc member, said outer fastening surfaces being provided with openings adapted to receive fastening members.

3. A spacer disc member for spacing a vehicle wheel outwardly with respect to an associated brake drum assembly, whereby to widen the transverse wheel base of the vehicle, said disc member comprising a one-piece generally circular body formed with a central wheel hub opening and a plurality of alternating, substantially radial corrugations, said corrugations having straight radial edges and substantially flat opposite outer fastening surfaces defined between said edges and located in respective planes on opposite sides of the disc member and perpendicular to the axis of the disc member and flaring radially outwardly in width, said outer fastening surfaces being provided at their intermediate portions with openings adapted to receive fastening members.

References Cited in the file of this patent

UNITED STATES PATENTS

| | | |
|---|---|---|
| 2,052,524 | Baker | Aug. 25, 1936 |
| 2,067,620 | Johnston et al. | Jan. 12, 1937 |
| 2,532,605 | Castleberry | Dec. 5, 1950 |
| 2,779,630 | Klinker | Jan. 29, 1957 |